United States Patent
Yasui

(10) Patent No.: US 9,553,467 B2
(45) Date of Patent: Jan. 24, 2017

(54) DISTRIBUTION APPARATUS

(71) Applicant: NABTESCO CORPORATION, Tokyo (JP)

(72) Inventor: Tsutomu Yasui, Gifu (JP)

(73) Assignee: NABTESCO CORPORATION, Tokyo (JP)

(*) Notice: Subject to any disclaimer, the term of this patent is extended or adjusted under 35 U.S.C. 154(b) by 144 days.

(21) Appl. No.: 14/532,665

(22) Filed: Nov. 4, 2014

(65) Prior Publication Data

US 2015/0123622 A1 May 7, 2015

(30) Foreign Application Priority Data

Nov. 5, 2013 (JP) ................................ 2013-229625

(51) Int. Cl.
*H02J 7/00* (2006.01)

(52) U.S. Cl.
CPC .............. *H02J 7/007* (2013.01); *H02J 7/0052* (2013.01)

(58) Field of Classification Search
CPC ................................ H02J 7/007; H02J 7/0052
USPC ....................................................... 320/162
See application file for complete search history.

(56) References Cited

U.S. PATENT DOCUMENTS

| | | | | | |
|---|---|---|---|---|---|
| 5,256,959 A | * | 10/1993 | Nagano | ................ | H02J 7/1446 320/123 |
| 5,608,309 A | * | 3/1997 | Hikita | ................... | H02J 7/1446 320/DIG. 10 |
| 5,973,460 A | * | 10/1999 | Taga | ........................ | B60K 6/26 318/139 |
| 6,965,816 B2 | * | 11/2005 | Walker | .................... | B64C 13/20 244/189 |
| 8,232,875 B2 | * | 7/2012 | Uchida | ................ | H01M 10/42 320/104 |
| 8,307,967 B2 | * | 11/2012 | Patwardhan | ......... | H01R 13/629 191/2 |
| 8,862,304 B2 | * | 10/2014 | Chen | ........................ | H02J 7/00 320/106 |
| 8,878,487 B2 | * | 11/2014 | Wu | ........................ | B60L 1/003 320/108 |

FOREIGN PATENT DOCUMENTS

JP 2007-46790 A 2/2007

* cited by examiner

*Primary Examiner* — Sun Lin
(74) *Attorney, Agent, or Firm* — Pillsbury Winthrop Shaw Pittman LLP

(57) ABSTRACT

Disclosed herein is an invention of a power system including a distal distributor, an electric actuator which receives a supply of power from the distal distributor, and a relay device. Regenerative power generated by the electric actuator is output to a storage battery.

10 Claims, 10 Drawing Sheets

DISTRIBUTION APPARATUS

TECHNICAL FIELD

The present invention relates to a distribution apparatus to which an electric actuator and a storage battery are connected.

BACKGROUND ART

An aircraft has various electrically powered devices. For example, such devices are driven by electric motors mounted in the aircraft. An example of such devices is an electrically powered hydraulic pump for supplying hydraulic oil to a hydraulically operated actuator which drives a movable wing, as disclosed in JP 2007-46790 A.

The movable wings are primary control surfaces which are constituted as rudder surfaces such as auxiliary wings (ailerons), rudders and elevators, or secondary control surfaces which are constituted as flaps, spoilers, and the like. Another example of the devices includes an electric actuator which drives the movable wings or legs such as landing gear (a mechanism supporting the body of the aircraft on the ground) or alike.

For example, the electric actuator which serves as an actuator for driving the movable wings has an electric motor and a ball mechanism. A rod of the screw mechanism is displaced by a drive force from the electric motor. The movable wings are displaced in response to the displacement of the rod.

In the case of the electric actuator, external forces such as air pressure act on the electric motor via a steering surface, the screw mechanism and alike during flight of the aircraft. In this case, the electric motor of the electric actuator functions as a power generator since the electric motor operates under the abovementioned external forces to generate regenerative power. JP 2007-46790 A does not consider how to handle such regenerative power. In short, JP 2007-46790 A does not consider effective usage of the regenerative power generated by the electric actuator.

Therefore, if it is attempted to use regenerative power generated by an electric actuator, power is sent from the electric actuator to a distributor situated in the aircraft. However, there may be an excessively large current if shorting or alike causes faults in the electric actuator. If regenerative power is sent to a distributor as described above, there is a risk of an abnormal current flowing in the distributor situated in the aircraft. There is also a risk of an abnormal current (excessively large current) flowing to the distributor resultant from a surge current caused by a lightning strike on the aircraft or alike.

SUMMARY OF INVENTION

The present invention has been developed in light of the aforementioned circumstances to provide a distribution apparatus in which there is little abnormality resultant from an excessively large current. The distribution apparatus may achieve efficient power use in an aircraft.

A distribution apparatus according to one aspect of the present invention is used for power distribution. The distribution apparatus includes: a distributor which uses regenerative power to charge a storage battery connected to the distribution apparatus, the regenerative power being generated by at least one electric actuator electrically connected to the distribution apparatus; and a switch situated between the distributor and the at least one electric actuator to interrupt a current when the current exceeds a prescribed level.

The aforementioned distribution apparatus may use power efficiently in an aircraft with causing little abnormality in the distributor.

Objects, features and advantages of the present invention will become more evident from the following detailed description and the accompanying drawings.

DESCRIPTION OF EMBODIMENTS

First Embodiment

An exemplary embodiment of a power system is described below with reference to the drawings.

Figure 1:
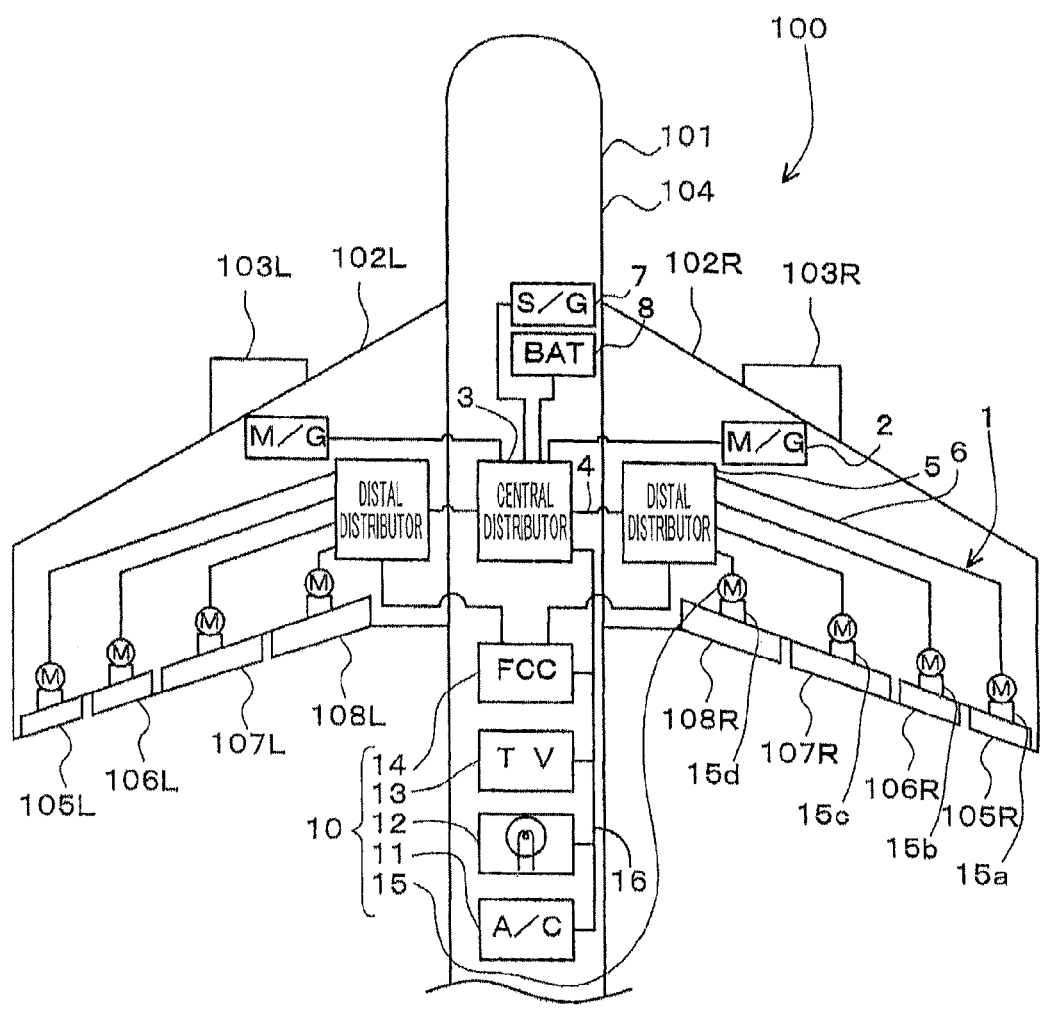
FIG. 1 is a schematic view showing a part of an aircraft having a power system according to the first embodiment.
Figure 2:
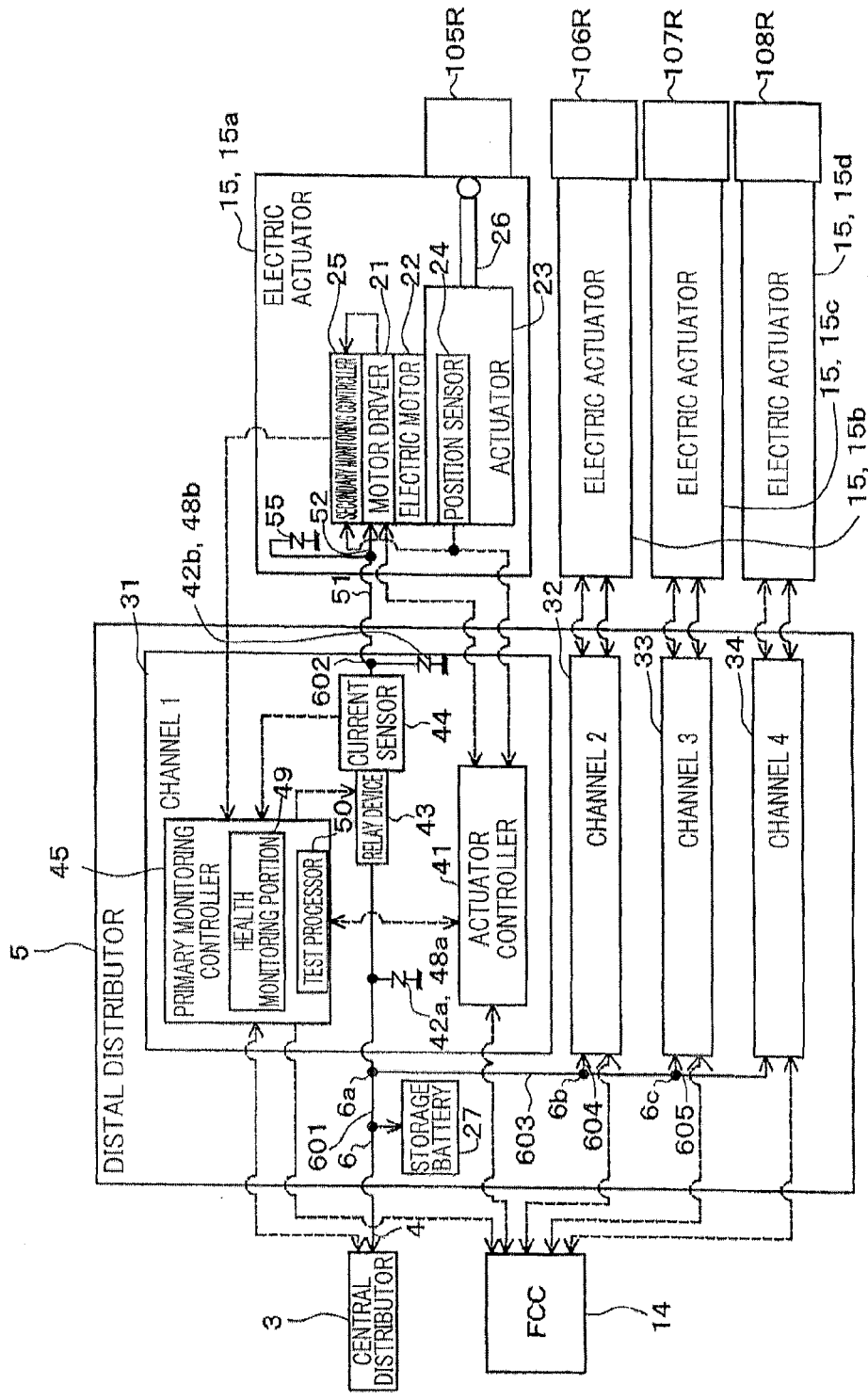
FIG. 2 is a schematic view of a main part of the power system.

FIG. 1 is a schematic view showing a part of an aircraft 100 having the exemplary power system 1 according to the first embodiment. FIG. 1 shows a front portion and a middle portion of a body 101 of an aircraft 100. A rear portion of the body 101 is not shown in FIG. 1. FIG. 2 is a schematic view of a main part of the power system 1.

The wires indicated in FIG. 2 by solid lines are power wires (high-voltage wires) which supply power in order to mechanically operate the electric actuators 15. On the other hand, the wires indicated in FIG. 2 by dotted lines are signal wires (low-voltage wires) for controlling the electric actuators 15.

As shown in FIG. 1, for example, the aircraft 100 may be a passenger plane. The aircraft 100 includes a body 101, a pair of left and right engines 103L, 103R, and the power system 1.

The body 101 includes a fuselage 104, and a pair of left and right main wings 102L, 102R which are connected to the fuselage 104.

Ailerons 105L, 106L, 105R, 106R and spoilers 107L, 108L, 107R, 108R are provided on the main wings 102L, 102R as rudder surfaces. These ailerons 105L, 106L, 105R, 106R and the spoilers 107L, 108L, 107R, 108R are operated by electric actuators 15 (described below).

For example, the engines 103L, 103R may be jet engines for supplying thrust to the body 101. In the present embodiment, turbofan engines are used as the engines 103L, 103R. The engines 103L, 103R are installed on the main wings 102L, 102R. The engines 103L, 103R have rotary shafts (not shown). The engines 103L, 103R are used to generate power which is consumed by the power system 1.

The power system 1 shown in FIGS. 1 and 2 is exemplified as "distribution apparatus". The power system 1 is configured to supply power to the electrical devices 10 situated in the aircraft 100.

A configuration of the power system 1 relating to the port (left) section of the body 101 is similar to a configuration of the power system 1 relating to the starboard (right) section of the body 101. Therefore, the configuration of the power system 1 relating to the starboard section of the body 101 is mainly described in the present embodiment. Description about the configuration of the power system 1 relating to the port section of the body 101 is partially omitted.

The power system 1 according to the present embodiment includes electric actuators 15 (15a, 15b, 15c, 15d). One of features of the power system 1 is that the power system 1 controls an interruption of a current flowing in the electric actuators 15. Another of the features of the power system 1 according to the present embodiment is that a central distributor 3 and/or a distal distributor 5 may charge the storage battery 27 with regenerative power when the regenerative power is generated by the electric actuators 15 which are connected electrically to the power system 1. A configuration of the power system 1 is described below in detail.

The power system 1 has a primary power generator 2, a central distributor 3, a first power source wire 4, a distal distributor 5, a second power source wire 6 situated in the distal distributor 5, a secondary power generator 7, a main battery 8 and electrical devices 10.

The primary power generator 2 is provided as a primary power source device. The primary power generator 2 may supply power which is consumed by the power system 1. In the present embodiment, the primary power generator 2 is a DC power generator. The primary power generator 2 is driven by the engine 103R which gives thrust to the aircraft 100.

The secondary power generator 7 is provided as a secondary power source device. For example, the secondary power generator 7 may generate power when the primary power generator 2 is stopped. For example, the secondary power generator 7 may include a gas turbine engine and a power generator. Power is generated by the power generator, which is driven under operation of the gas turbine engine. In the present embodiment, the secondary power generator 7 is a DC power generator. The power is output from the secondary power generator 7 to the central distributor 3.

For example, the main battery 8 may be a secondary cell such as a lithium ion storage battery. The main battery 8 may supply power to the central distributor 3. The main battery 8 may store power from the primary or secondary power generator 2, 7.

The power system 1 according to the present embodiment is designed to optimize power distribution from each of the primary power generator 2, the secondary power generator 7 and the main battery 8.

In the present embodiment, the power system 1 uses DC power. However, the power system 1 may use AC power. In this case, a converter is incorporated in the power system 1 to convert power between DC and AC. For example, if the primary and secondary power generators 2, 7 are AC power generators, the generated AC power is converted into DC power by an AC/DC converter in the central distributor 3. The DC power generated by the primary power generator 2 is supplied to the central distributor 3.

The central distributor 3 is provided as a primary power distribution board in the aircraft 100. The central distributor 3 is configured to distribute power from each of the primary power generator 2, the secondary power generator 7 and the main battery 8 to the distal distributor 5 and alike. In the present embodiment, power is output from all of the primary power generator 2, the secondary power generator 7 and the main battery 8 to the central distributor 3. For example, the central distributor 3 may include a DC/DC converter. The central distributor 3 is configured to convert a power voltage from the primary power generator 2 and alike.

The central distributor 3 is situated in the fuselage 104. In the present embodiment, the central distributor 3 is situated inside the fuselage 104 between the main wings 102L, 102R. The central distributor 3 is connected to the first power source wire 4. The first power source wire 4 extends inside the fuselage 104 and the main wing 102R. The first power source wire 4 is connected to the distal distributor 5.

The distal distributor 5 is exemplified as "distributor". DC power supplied from the central distributor 3 is distributed to the electric actuators 15 (15a, 15b, 15c, 15d) by the distal distributor 5. AC power may be supplied from the central distributor 3 to the distal distributor 5. The distal distributor 5 is connected electrically to the central distributor 3 via the first power source wire 4. The distal distributor 5 receives power supply from the central distributor 3. In this way, since there is the distal distributor 5 in addition to the central distributor 3, wires do not have to be provided independently from the electric actuators 15a, 15b, 15c, 15d to the central distributor 3. Therefore, there is a reduction in an electric wire weight in the aircraft 100. Only a small space is required for wires in the aircraft 100.

In the present embodiment, there is one first power source wire 4. The first power source wire 4 may be a coated wire constituted by a single conductive wire which is coated. Alternatively, the first power source wire 4 may be a coated wire in which several conducting wires are gathered to form a single conductive wire which is coated. Further alternatively, the first power source wire 4 may be a multi-core cable.

There may be several first power source wires 4. In this case, each of the first power source wires 4 is connected to the central distributor 3 and the distal distributor 5. For example, if a voltage of the first power source wire 4 is ±270 V, there may be two first power source wires 4. In this case, a body earth voltage of the body 101 is 0 V. In the present embodiment, the distal distributors 5 are situated in the main wings 102R. The distal distributors 5 are away from the central distributor 3. A detailed configuration of the distal distributors 5 is described below.

There may be several electrical devices 10. The electrical devices 10 are operated mainly by power which is generated by the primary power generator 2. For example, an air conditioner 11, an illuminator 12, a television system 13, a flight control computer (FCC) 14 and electric actuators 15 (15a, 15b, 15c, 15d) are provided as the electrical devices 10 in the aircraft 100.

The air conditioner 11, the passenger cabin illuminator 12, the television system 13 and the flight control computer 14 are fuselage-mounted electrical devices, which are situated in the fuselage 104. Each of the air conditioner 11, passenger cabin illuminator 12, television system 13 and flight control computer 14 is connected directly to the central distributor 3 via a third power source wire 16. The air conditioner 11, the passenger cabin illuminator 12, the television system 13 and the flight control computer 14 operate under power supply from the central distributor 3.

The air conditioner 11 is used for temperature adjustment inside the passenger cabin of the fuselage 104. The passenger cabin illuminator 12 includes illuminators which are situated in the passenger cabin of the fuselage 104. The passenger cabin illuminator 12 is configured to illuminate an interior of the passenger cabin. The television system 13 includes television receivers which are situated in the passenger cabin of the fuselage 104. The television system 13 is configured to display various video images on the television receivers.

The flight control computer 14 includes a central processing unit (CPU), a random access memory (RAM), a read only memory (ROM) and alike. The flight control computer 14 is provided as an integrated controller for flight of the aircraft 100. The flight control computer 14 is configured to output prescribed control signals in response to signals output from a control stick (not shown).

For example, if an instruction to operate the aileron 105R is transmitted from the control stick to the flight control computer 14, control signals for operating the aileron 105R are output from the flight control computer 14 to the distal distributor 5.

The electric actuators 15 (15a, 15b, 15c, 15d) are used for the flight control system. The electric actuators 15 (15a, 15b, 15c, 15d) operate in response to the control signals from the flight control computer 14. The electric actuators 15 are situated in the main wings 102R, 102L.

The electric actuators 15a, 15b are provided so as to move the ailerons 105R, 106R as movable wings. The electric actuators 15c, 15d are provided so as to move the spoilers 107R, 108R as movable wings. Since each of the electric actuators 15a, 15b, 15c, 15d has a similar configuration, the configuration of the electric actuator 15a is described in detail whereas detailed description about the electric actuators 15b, 15c, 15d is omitted in the present embodiment.

In the present embodiment, the electric actuator 15a includes a direct current (DC) servo motor. The electric actuator 15a is operated by DC power. The electric actuator 15a may be an alternating current (AC) servo motor. In this case, a converter is provided in the distal distributor to convert power between DC and AC. The AC power is supplied from the converter to the electric actuator 15a.

The electric actuator 15a has a motor driver 21, an electric motor 22, an actuator 23, a position sensor 24 and a secondary monitoring controller 25.

The motor driver 21 is a motor drive circuit. The motor driver 21 outputs prescribed power to the electric motor 22 in response to velocity instruction signals from an actuator controller 41 (described below) of the distal distributor 5. The motor driver 21 receives supply of current (current from the second power source wire 6) passing through a current sensor 44 (described below) of the distal distributor 5.

The electric motor 22 is driven under power supply from the motor driver 21. In the present embodiment, the electric motor 22 is a DC motor. Rotary motion of a rotary shaft of the electric motor 22 is transmitted to the actuator 23.

The actuator 23 is provided as a motion converting mechanism. The actuator 23 may convert rotary motion into linear motion and linear motion into rotary motion. In the present embodiment, the actuator 23 converts rotary motion of the rotary shaft of the electric motor 22 into linear motion. The actuator 23 converts linear motion resultant from displacement of the aileron 105R into rotary motion of the rotary shaft of the electric motor 22.

In the present embodiment, the actuator 23 includes a ball screw mechanism. The ball screw mechanism includes a movable portion 26 which includes a male thread member.

The movable portion 26 is displaced linearly in response to rotation of the rotary shaft of the electric motor 22. The movable portion 26 is coupled to the point of load of the aileron 105R. The aileron 105R is swung around a prescribed fulcrum shaft under displacement of the movable portion 26.

For example, power supply to the electric motor 22 may be stopped when the aileron 105R is in an inclined attitude with respect to an immobile portion of the main wing 102R. In this case, the aileron 105R receives air resistance and rotates about a fulcrum shaft. Consequently, the aileron 105R is displaced towards the immobile portion of the main wing 102R. In this case, the point of load of the aileron 105R displaces the movable portion 26 linearly in response to the displacement of the aileron 105R. The linear motion of the movable portion 26 is converted into a rotary motion in the actuator 23 to cause rotation of the rotary shaft of the electric motor 22.

The electric motor 22 functions as a DC power generator to generate DC power during the rotation of the rotary shaft of the electric motor 22. In short, the electric motor 22 generates regenerative power. The regenerative power is supplied to a storage battery 27 via the motor driver 21, the current sensor 44 (described below) and a relay device 43. If a DC motor is used as the electric motor 22, the regenerative DC power is supplied to the storage battery 27 without conversion from AC to DC. The aforementioned displacement of the rotary shaft of the electric motor 22 (displacement of the movable portion 26) (i.e. a steering surface angle of the aileron 105R) is measured by a position sensor 24.

The position sensor 24 is configured to detect a position of the movable portion 26 of the electric actuator 15a. In the present embodiment, position signals are output from the position sensor 24 to the secondary monitoring controller 25 (described below) and an actuator controller 41 (described below).

The secondary monitoring controller 25 is provided in order to determine whether or not there is abnormality in the electric actuator 15a. The secondary monitoring controller 25 is provided in order to output signals identifying a power amount output from the motor driver 21 and position signals from the position sensor 24 to the primary monitoring controller 45 of the distal distributor 5.

For example, the secondary monitoring controller 25 includes a CPU, a RAM and a ROM. The secondary monitoring controller 25 reads position signals output from the position sensor 24. The secondary monitoring controller 25 stores the position signals as digital data. Data identifying a power amount output from the electric motor 22 to the motor driver 21 is transmitted from the motor driver 21 to the secondary monitoring controller 25, so that the secondary monitoring controller 25 stores the data as digital data. The secondary monitoring controller 25 outputs the aforementioned digital data to the primary monitoring controller 45. The secondary monitoring controller 25 reads velocity instruction signals which are supplied from the actuator controller 41 to the motor driver 21.

As described above, the secondary monitoring controller 25 monitors whether or not there is abnormality in the electric actuator 15a. More specifically, for example, the secondary monitoring controller 25 determines whether or not a difference between a target position of the movable portion 26, which the velocity instruction signals generated by the actuator controller defines a prescribed time after the generation of the velocity instruction signals, and an actual position of the movable portion 26, which is detected by the position sensor 24, is within a prescribed range.

If the difference is within the prescribed range, the secondary monitoring controller 25 determines that the electric actuator 15a is normal. In this case, notification signals indicating that the electric actuator 15a operates normally are output from the secondary monitoring controller 25 to the flight control computer 14 via the primary monitoring controller 45.

On the other hand, for instance, if the actuator 23 is locked by foreign objects trapped in the actuator 23, the electric motor 22 and the actuator 23 may not operate even under the velocity instruction signals transmitted to the motor driver 21. As a result, there are unchanged position signals indicating a position of the movable portion 26. In this case, the difference between the target and actual positions exceeds the prescribed range.

In this case, the secondary monitoring controller 25 determines that there is abnormality in the electric actuator 15a, and then notification signals for reporting the abnormality are output to the flight control computer 14 via the primary monitoring controller 45. The primary monitoring controller 45 is provided in the distal distributor 5.

In the present embodiment, the distal distributor 5 is exclusively provided as a distal distributor for the flight control system. The distal distributor 5 supplies power to the electric actuators 15 (15a, 15b, 15c, 15d) relating to flight control of the aircraft 100. The distal distributor 5 receives power supply from the primary power generator 2, the secondary power generator 7 or the main battery 8, or alike of the aircraft 100 via the central distributor 3. Electric power is output from the distal distributor 5 to the electric actuators 15 (15a, 15b, 15c, 15d). The distal distributor 5 is configured to output power from the storage battery 27 to the electric actuators 15a, 15b, 15c, 15d. In this way, devices other than the devices of the flight control system may be connected to the distal distributor 5.

The distal distributor 5 has a second power source wire 6, a storage battery 27 and channels 31, 32, 33, 34.

For example, the second power source wire 6 is connected to the first power source wire 4 by an electric connector (not shown).

The second power source wire 6 has a first portion 601, a second portion 602, a third portion 603, a fourth portion 604 and a fifth portion 605.

The first portion 601 connects the first power source wire 4 to a relay device 43 (described below) of a channel 31. The second portion 602 connects the current sensor 44 of the channel 31 (described below) to a fourth power source wire 51. The fourth power source wire 51 is connected to the motor driver 21 via a power source wire 52 in the electric actuator 15a. The third portion 603 branches from a bifurcation 6a of the first portion 601. The fourth portion 604 branches from a bifurcation 6b in the third portion 603. The fourth portion 604 is connected to a channel 32. The fifth portion 605 branches from a bifurcation 6c in the third portion 603. The fifth portion 605 is connected to a channel 33. The third portion 603 is connected to a channel 34.

The storage battery 27 is connected to the first portion 601 of the second power source wire 6 between a connecting portion to the first power source wire 4 and the bifurcation 6a.

The storage battery 27 is provided in order to store regenerative power generated by the respective electric actuators 15a, 15b, 15c, 15d. For example, the storage battery 27 may be a secondary cell such as a lithium ion storage battery, a flywheel battery, a capacitor or alike. The storage battery 27 is chargeable and dischargeable. The storage battery 27 is connected to the first power source wire 4 via the second power source wire 6. The storage battery 27 may store electric power from the central distributor 3. For example, the storage battery 27 supplies power to the channels 31, 32, 33, 34 (the electric actuators 15a, 15b, 15c, 15d) and the wing illuminator 18 when there is a decrease in the power supplied from the central distributor 3.

Each of the channels 31, 32, 33, 34 are provided as a unit controller for controlling the corresponding one of the electric actuators 15a, 15b, 15c, 15d. Each of the channels 31, 32, 33, 34 has a similar configuration. Therefore, a configuration of the channel 31 for controlling the electric actuator 15a is mainly described whereas detailed description about the channels 32, 33, 34 is omitted.

The analogous configuration among the channels 31, 32, 33, 34 does not limit principles of the present embodiment in any way. For instance, at least a part of the configurations of the channels 31, 32, 33, 34 may be different.

The channel 31 has an actuator controller 41, lightning surge protectors 42a, 42b, a relay device 43, a current sensor 44 and a primary monitoring controller 45.

The actuator controller 41 is provided in order to control the electric actuator 15a. The actuator controller 41 is connected to the flight control computer 14, the primary monitoring controller 45 and the motor driver 21 of the electric actuator 15a. The actuator controller 41 is formed by using a CPU, a RAM, a ROM and alike. The actuator controller 41 generates signals for causing the electric actuator 15a to perform an operation in response to control signals from the flight control computer 14.

The actuator controller 41 reads control signals output from the flight control computer 14 and position signals from the position sensor 24. The actuator controller 41 generates velocity instruction signals in response to these signals.

The actuator controller 41 calculates a target position of the movable portion 26 under feedback control using control signals from the flight control computer 14 and signals representing a position of the movable portion 26 detected by the position sensor 24. The actuator controller 41 generates velocity instruction signals for displacing the movable portion 26 to the target position. The actuator controller 41 outputs the velocity instruction signals to the motor driver 21 of the electric actuator 15a.

The lightning surge protectors 42a, 42b allow a large current such as a lightning current to escape outside the aircraft 100 when the large current is input from the electric actuator 15a or alike to the first and second portions 601, 602 of the second power source wire 6. The lightning surge protectors 42a, 42b makes a large current such as a lightning surge current less likely to flow to the central distributor 3. For example, the lightning surge protectors 42a, 42b include variable resistances 48a, 48b.

One end of the variable resistance 48a is connected to the first portion 601 of the second power source wire 6 between the bifurcation 6a and the relay device 43. For example, the other end of the variable resistance 48a is connected to a discharge cable (not shown). One end of the variable resistance 48b is connected to the second portion 602. For example, the other end of the variable resistance 48b is connected to a discharge cable (not shown). According to the aforementioned configuration, the lightning surge protectors 42a, 42b are connected electrically to the electric motor 22 of the electric actuator 15a via the first and second portions 601, 602 of the second power source wire 6 and alike.

The lightning surge protector 42b (variable resistance 48b) may not be situated in the channel 31. For example, the variable resistance 48b may be situated outside the channel 31 in the distal distributor 5.

In the present embodiment, a lightning surge protector 55 is provided in addition to the lightning surge protectors 42a, 42b. For example, the lightning surge protector 55 is a variable resistance. One end of the lightning surge protector 55 is connected to the power source wire 52 in the electric actuator 15a. The other end of the lightning surge protector 55 is connected to a discharge cable (not shown).

In the present embodiment, the variable resistances 42a, 42b, 55 are exemplified as the variable resistances for countering lightning surges. However, in addition to the aforementioned variable resistances, the variable resistances for countering lightning surges are preferably provided in all signal wires and power source wires connected to the distal distributor 5 and in all of signal wires and power source wires connected to the electric actuator 15.

The relay device 43 is exemplified as "switch". The relay device 43 is situated between the distal distributor 5 and the electric actuator 15a to selectively set connection and interruption of drive power for the electric motor 22 of the electric actuator 15a. In short, the relay device 43 may interrupt a current flowing between the distal distributor 5 and the electric actuator 15a. The relay device 43 includes an electromagnetic relay. The relay device 43 in the second power source wire 6 is situated between the lightning surge protector 42a and the current sensor 44 (between the first and second portions 601, 602). The relay device 43 in the second power source wire 6 is situated between the storage battery 27 and the electric actuator 15a. The relay device 43 is connected to the primary monitoring controller 45. The relay device 43 is controlled by the primary monitoring controller 45.

When the primary monitoring controller 45 controls the relay device 43 to an on state, power may be supplied from the central distributor 3 to the electric actuator 15a via the second portion 602 of the second power source wire 6 or alike. In this case, regenerative power of the electric motor 22 may be supplied to the storage battery 27. On the other hand, when the relay device 43 is controlled to an off state by the primary monitoring controller 45, there is interruption of power supply from the central distributor 3 to the second power source wire 6 in the channel 31. In short, since a current flowing from the second power source wire 6 is interrupted between the distal distributor 5 and the electric actuator 15a, there is interruption of power supply from the distal distributor 5 to the motor driver 21 and the electric motor 22 of the electric actuator 15a.

In this case, there is interruption of the power supply from the electric actuator 15a to the second power source wire 6. In short, them is interruption of power supply from the electric actuator 15a to the storage battery 27. The relay device 43 is adjacent to the current sensor 44.

The current sensor 44 is provided in order to detect a current (current value) in the channel 31, the current flowing in the second power source wire 6. Current detection signals generated by the current sensor 44 are output to the primary monitoring controller 45.

The primary monitoring controller 45 is exemplified as "monitoring controller". The primary monitoring controller 45 monitors whether there is abnormality happening to the electric actuator 15a. In the present embodiment, the primary monitoring controller 45 carries out different control from control by the actuator controller 41. The primary monitoring controller 45 is exemplified as "gating controller". The primary monitoring controller 45 controls a gating operation of the relay device 43 (switch) which is connected to the primary monitoring controller 45.

The primary monitoring controller 45 is formed by using a CPU, a RAM, a ROM and alike. In the present embodiment, the primary monitoring controller 45 and the actuator controller 41 are configured by using different central processing units (CPUs). The primary monitoring controller 45 is configured to execute control about operations of the electric actuator 15a on the basis of information from the actuator controller 41, information from the electric actuator 15a and information from the current sensor 44.

More specifically, velocity instruction signals for the motor driver 21 (electric motor 22) and data identifying a power amount output from the motor driver 21 to the electric motor 22 are transmitted from the secondary monitoring controller 25 of the electric actuator 15a to the primary monitoring controller 45. Signals representing a current value between the first and second portions 601, 602 of the second power source wire 6 in channel 31 are transmitted from the current sensor 44 to the primary monitoring controller 45. Position signals from the position sensor 24 are transmitted from the actuator controller 41 to the primary monitoring controller 45.

The primary monitoring controller 45 includes a health monitoring portion 49 and a test processor 50.

The health monitoring portion 49 may monitor and diagnose operational states of the electric actuator 15a. More specifically, the health monitoring portion 49 diagnoses an operating state (efficiency) of the electric actuator 15a on the basis of a relationship between a power amount supplied from the distal distributor 5 to the electric actuator 15a and a mechanical operation amount of the movable portion 26 of the electric actuator 15a. Processes of the health monitoring portion 49 are described below more specifically.

For example, the test processor 50 of the primary monitoring controller 45 is provided in order to carry out operational tests of the electric actuator 15a when the power system 1 is activated. In short, the test processor 50 is used when the aircraft 100 is parked. The test processor 50 may be used as an incorporated test device, which is incorporated into the aircraft 100.

In the present embodiment, the test processor 50 is configured to test the electric actuator 15a. The test processor 50 is not limited to a test of the electric actuator 15a. The test processor 50 may be configured to carry out an operational test of the relay device 43. Processes of the test processor 50 are described below more specifically.

The primary monitoring controller 45 is connected to the flight control computer 14. Process contents of the primary monitoring controller 45 are output to the flight control computer 14.

Figure 3:
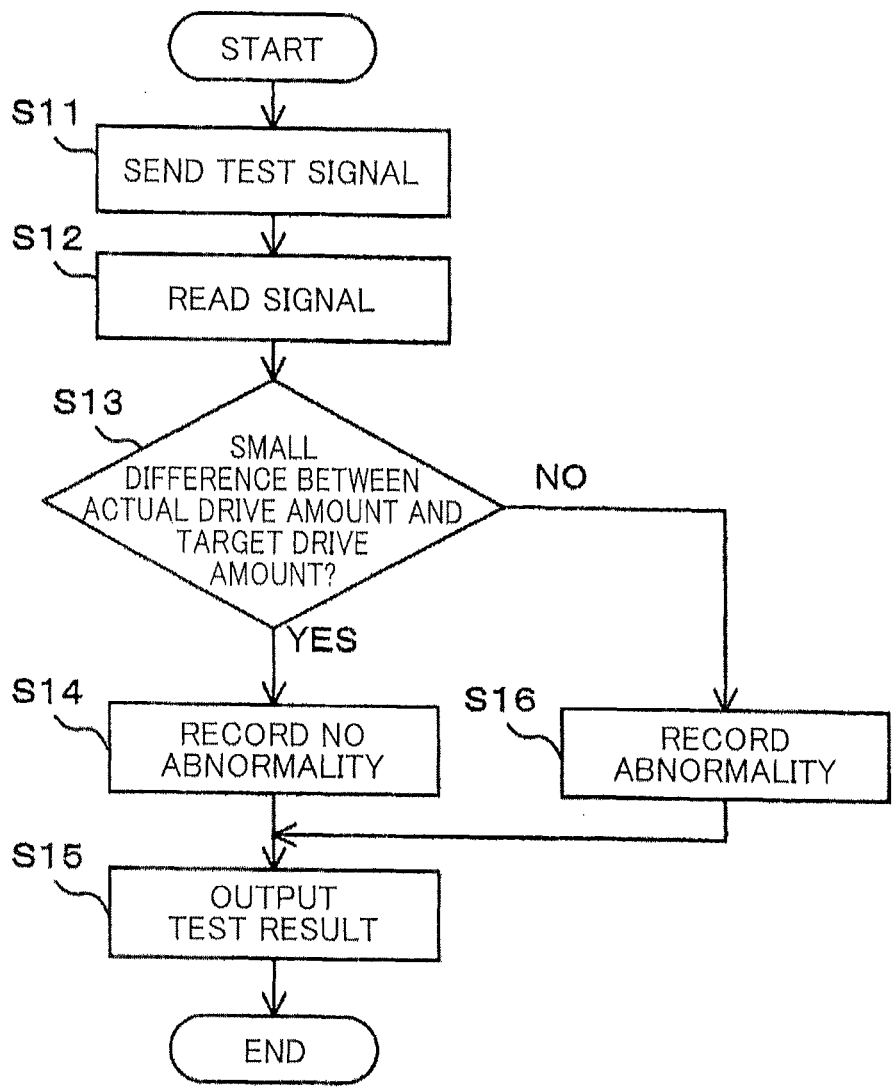
FIG. 3 is a flowchart showing exemplary control in a test processor of a primary monitoring controller.

An exemplary process flow in the primary monitoring controller 45 is described. FIG. 3 is a flowchart showing exemplary control of the test processor 50 of the primary monitoring controller 45. Diagrams other than the flowcharts may be also referred as appropriate in the description with reference to the flowcharts.

As shown in FIG. 3, the test processor 50 firstly outputs test signals to the actuator controller 41 (step S11). For example, the test signals instruct the electric actuator 15a to change a steering surface angle of the aileron 105R by several degrees. The test signals are simulated signals which simulate control signals of the flight control computer 14.

The actuator controller 41 receiving the test signals generates velocity instruction signals for changing a steering surface angle of the aileron 105R by several degrees. The actuator controller 41 outputs the velocity instruction signals to the motor driver 21. Without abnormality in the electric actuator 15a, the rotary shaft of the electric motor 22 of the electric actuator 15a rotates by a rotation amount instructed by the velocity instruction signals. Accordingly, the steering surface angle of the aileron 105R is changed by several degrees since the movable portion 26 is displaced by a prescribed amount.

Next, the test processor 50 reads signals output from the secondary monitoring controller 25 (step S12). The test processor 50 then determines a difference between the actual drive amount of the movable portion 26 (the rotary shaft of the electric motor 22), which is identified by the signals output from the secondary monitoring controller 25, and the target drive amount defined by the test signal (step S13).

If the difference between the actual drive amount and the target drive amount is no more than a prescribed threshold value, the test processor 50 determines that the difference between the actual drive amount and the target drive amount is small (YES at step S13). In this case, the test processor 50 records test result signals indicating that there is no abnormality in the test result (step S14), and also outputs the test result signals to the central distributor 3 and the flight control computer 14 (step S15).

On the other hand, if the difference between the actual drive amount and the target drive amount exceeds the prescribed threshold value, the test processor 50 determines that the difference between the actual drive amount and the target drive amount is large (NO at step S13). In this case, the test processor 50 records test result signals indicating that there is abnormality in the test result (step S16), and also outputs the test result signals to the central distributor 3 and the flight control computer 14 (step S15).

Figure 4:
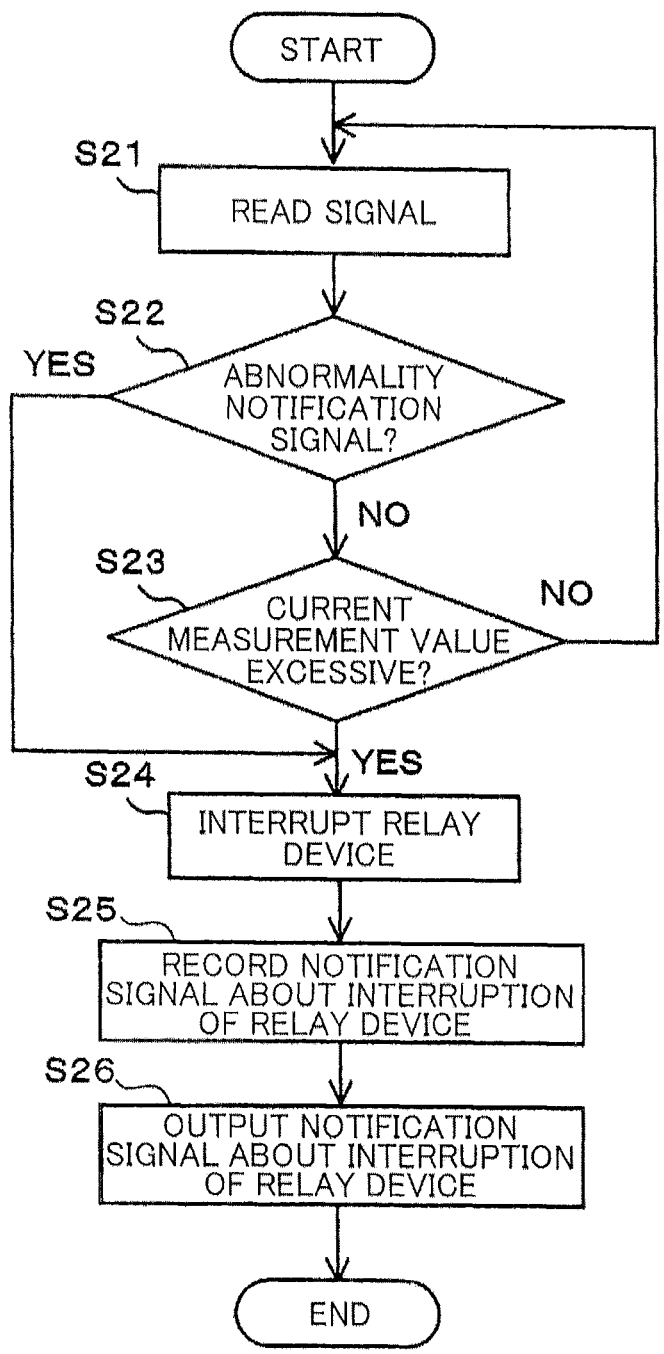
FIG. 4 is a flowchart showing exemplary control for a relay device of the primary monitoring controller.

Exemplary control of the relay device 43 in the primary monitoring controller 45 is described. FIG. 4 is a flowchart showing exemplary control of the relay device 43 in the primary monitoring controller 45. As shown in FIG. 4, the relay device 43 is always switched on when the aircraft 100 is in operation. Power supplied from the central distributor 3 to the second power source wire 6 may be transmitted to the electric actuator 15a by the relay device 43. In this state, the primary monitoring controller 45 reads signals from the flight control computer 14 and the current sensor 44 (step S21).

The primary monitoring controller 45 then determines whether or not notification signals indicating abnormality (abnormality notification signals) are output from the flight control computer 14 (step S22). When abnormality notification signals are output from the flight control computer 14 (YES at step S22), the primary monitoring controller 45 interrupts the relay device 43 by turning the relay device 43 to an off state (step S24). Consequently, there is interruption of current passage from the central distributor 3 to the electric actuator 15a via the second power source wire 6. In short, the motor drive power source of the electric actuator 15a is interrupted.

On the other hand, without abnormality notification signals output from the flight control computer 14 (NO at step S22), the primary monitoring controller 45 determines whether or not a current value of the second power source wire 6 detected by the current sensor 44 is excessive (abnormal) (step S23). More specifically, if there is no abnormality in the electric actuator 15a and if the aforementioned current measurement value is no greater than the prescribed threshold value, the primary monitoring controller 45 does not determine that the current value is excessive (NO at step S23). In this case, the primary monitoring controller 45 repeats the process in step S21 again.

On the other hand, the electric motor 22 may be shorted by faults in the electric actuator 15a. As a result, for example, an abnormal current may flow in the second portion 602 of the second power source wire 6. For instance, an abnormal current may flow in the second portion 602 of the second power source wire 6 as a result of earth fault of the fourth power source wire 51.

In these cases, a current value of the second portion 602 of the second power source wire 6 exceeds a prescribed threshold value (YES at step S23). In this event, the primary monitoring controller 45 performs a gating operation in response to a detection value about a current detected by the current sensor 44. Therefore, the primary monitoring controller 45 interrupts the relay device 43 as described above (step S24). More specifically, the relay device 43 may interrupt a current when the current exceeds a prescribed level.

When the relay device 43 is interrupted, the primary monitoring controller 45 generates notification signals indicating interruption of the relay device 43. The notification signals, which indicate the interruption of the relay device 43, are stored in the primary monitoring controller 45 (step S25). The notification signals indicating the interruption of the relay device 43 are output from the primary monitoring controller 45 to the central distributor 3 and the flight control computer 14 (step S26).

Figure 5:
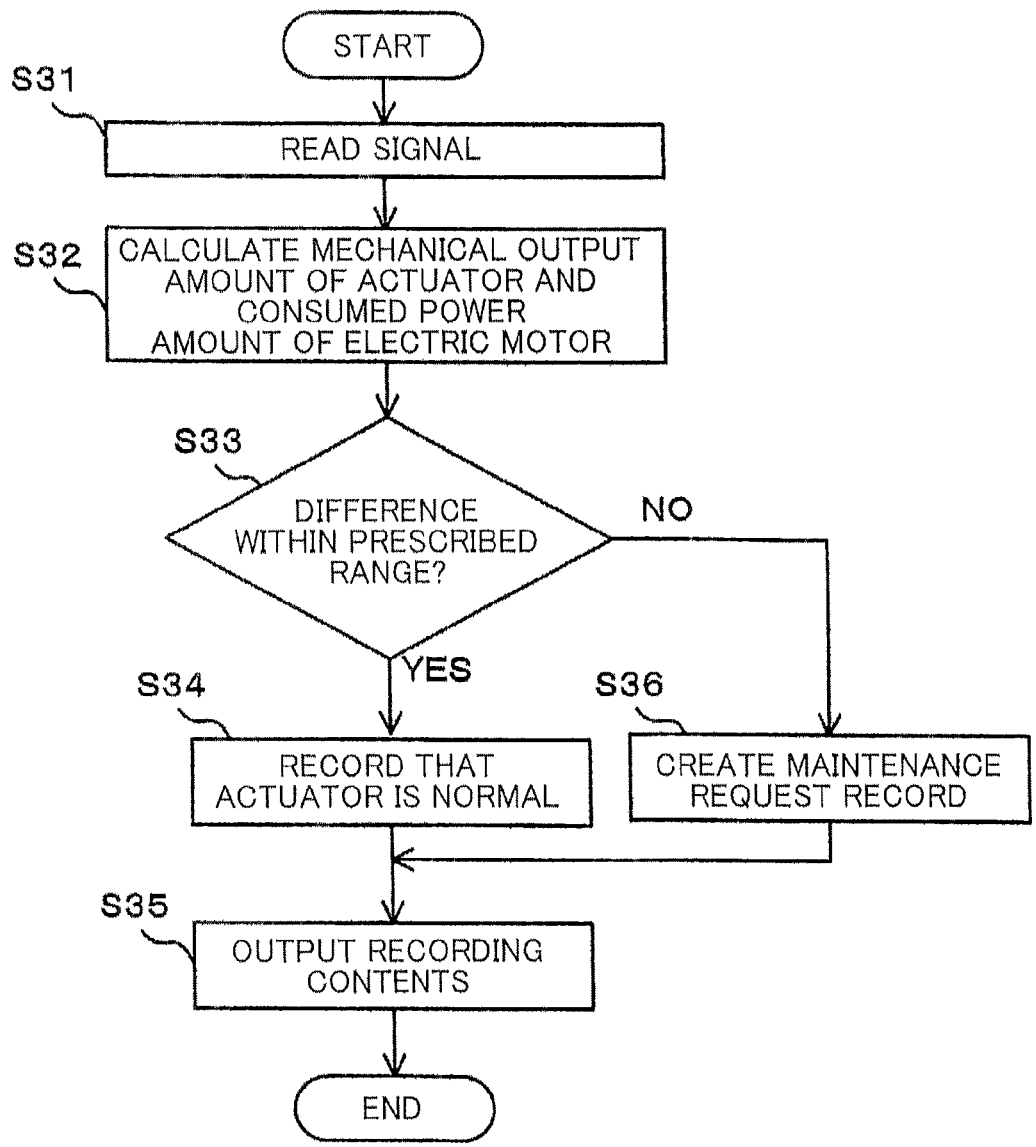
FIG. 5 is a flowchart showing an exemplary process flow in a health monitoring portion of the primary monitoring controller.

Exemplary processes by the health monitoring portion 49 of the primary monitoring controller 45 are described. FIG. 5 is a flowchart showing an exemplary process flow in the health monitoring portion 49 of the primary monitoring controller 45.

As shown in FIG. 5, the health monitoring portion 49 operates while the aircraft 100 is parked and while the aircraft 100 operates. The health monitoring portion 49 reads signals from the secondary monitoring controller 25 of the electric actuator 15a (step S31).

The health monitoring portion 49 then calculates a mechanical output amount of the actuator 23 and a power consumption amount of the electric motor 22 (step S32). In this case, the mechanical output amount of the actuator 23 means a displacement amount of the movable portion 26 of the actuator 23. The power consumption amount of the electric motor 22 indicates a power supply amount from the motor driver 21 to the electric motor 22.

The health monitoring portion 49 then compares the mechanical output amount of the actuator 23 to the power consumption amount of the electric motor 22 (step S33). For example, if a difference between the mechanical output amount of the actuator 23 and the power consumption amount of the electric motor 22 is within the prescribed range (YES in step S33), the health monitoring portion 49 determines that there is a small difference between the power consumption amount of the electric motor 22 and the mechanical output amount of the actuator 23.

In this case, since there is high conversion efficiency between power (electrical energy) and kinetic energy in the electric actuator 15a, it is not expected that the electric actuator 15a have reached the maintenance period. Therefore, the health monitoring portion 49 generates record data indicating that the electric actuator 15a is in a normal state in which maintenance is not required (step S34). The health monitoring portion 49 outputs the record data to the flight control computer 14 (step S35).

On the other hand, if the difference between the mechanical output amount of the actuator 23 and the power consumption amount of the electric motor 22 exceeds a prescribed range (NO in step S33), the health monitoring portion 49 determines that there is a large difference between the power consumption amount of the electric motor 22 and the mechanical output amount of the actuator 23. In this case, for example, it is expected that conversion efficiency between power (electrical energy) and kinetic energy in the electric actuator 15a has declined because of a decrease in lubricating oil or alike, which is applied to the movable portion 26 of the actuator 23.

In this case, it is determined that the electric actuator 15a has reached the maintenance period. Therefore, the health monitoring portion 49 generates record data indicating that the electric actuator 15a has reached the maintenance period (step S36). The health monitoring portion 49 outputs the record data to the flight control computer 14 (step S35).

As described above, when regenerative power is generated by the electric actuator 15a, the power system 1 according to the present embodiment may output regenerative power to the storage battery 27. Accordingly, the power system 1 may use the regenerative power generated by the electric actuator 15a for the electric actuator 15a or other electric actuators 15b, 15c, 15d. Therefore, the aircraft 100 may use power very efficiently. If there is abnormality such as shorting in the electric actuator 15a, the power system 1 may cause an off operation of the relay device 43 to prevent an abnormal current from flowing from the electric actuator 15a to the distal distributor 5 and the central distributor 3. Consequently, there is little abnormality happening to the distal distributor 5 and the central distributor 3. As described above, the power system 1 may achieve very efficient power usage in the aircraft with little abnormality in the distributors 3, 5.

According to the power system 1, the electric actuator 15a is an electric actuator for a flight control system for operating the aileron 105R of the aircraft 100. According to the aforementioned configuration, the electric actuator 15a for the flight control system generates regenerative power as a result of the corresponding aileron 105R operating due to receiving air resistance. This regenerative power is output to the storage battery 27. Therefore, the aircraft 100 may use power very efficiently.

According to the power system 1, power generated by the primary power generator 2 of the aircraft 100 is output from the distal distributor 5 to the electric actuator 15a. The distal distributor may output power from the storage battery 27 to the electric actuator 15a. According to the aforementioned configuration, the distal distributor 5 may output power from at least one of the primary power generator 2 and the storage battery 27 to the electric actuator 15a. When the power stored in the storage battery 27 is supplied to the electric actuator 15a, there is a reduction in power generation load of the primary power generator 2. Consequently, since the primary power generator 2 requires a small amount of energy for the power generation operation, the aircraft 100 may use power very efficiently. For example, in the event of abnormality in the primary power generator 2, the electric actuator 15a may be operated by power from the storage battery 27. Consequently, the electric actuator 15a may operate very reliably.

According to the power system 1, the primary monitoring controller 45 switches off the relay device 43 when it is determined that a current value flowing between the distal distributor 5 and the electric actuator 15a is an abnormal value. According to the aforementioned configuration, the primary monitoring controller 45 may switch off the relay device 43 to prevent an abnormal current flowing in the central distributor 3, the distal distributor 5 and the electric actuator 15a.

According to the power system 1, the distal distributor 5 includes lightning surge protectors 42a, 42b which are electrically connected to the electric actuator 15a. The lightning surge protectors 42a, 42b may prevent a surge current caused by a lightning strike from flowing in the central distributor 3 and the distal distributor 5. The lightning surge protectors 42a, 42b are provided between the bifurcation 6a and the electric actuator 15a. Consequently, a lightning surge current flowing to the electric actuator 15a is less likely to flow to the other electric actuators 15b, 15c, 15d.

According to the power system 1, the electric actuator 15a is controlled by the actuator controller 41. The primary monitoring controller 45 monitors abnormality happening to the electric actuator 15a.

According to the power system 1, the actuator controller 41 and the primary monitoring controller 45 are different central processing units (CPU) from each other, which are situated in the distal distributor 5. According to the aforementioned configuration, since both of the actuator controller 41 and the primary monitoring controller 45 are situated in the distal distributor 5, the actuator controller 41 is placed near the primary monitoring controller 45. Therefore, there may be a compact design of the power system 1. The actuator controller 41 and the primary monitoring controller 45 are formed from different CPUs. Therefore, there is a decreased calculation load in the actuator controller 41. Consequently, the actuator controller 41 may quickly carry out calculation processes for controlling the electric actuator 15a with few errors. Therefore, there is a high control speed of the actuator controller 41 for the electric actuator 15a.

According to the power system 1, the primary monitoring controller 45 may operate as a gating controller which controls a gating operation of the relay device 43.

According to the power system 1, the primary monitoring controller 45 may have a function for diagnosing an operating state of the electric actuator 15a (i.e. a health monitoring function for the electric actuator 15a). Consequently, there is simplified maintenance of the electric actuator 15a.

More specifically, the primary monitoring controller 45 diagnoses an operating state of the electric actuator 15a on the basis of a relationship between a power supply amount from the distal distributor 5 to the electric actuator 15a and a mechanical operation amount of the electric actuator 15a. According to the aforementioned configuration, for example, when the mechanical operation amount of the movable portion 26 of the electric actuator 15a is excessively smaller than the power supply amount from the distal distributor 5 to the electric actuator 15a, the primary monitoring controller 45 may determine that there is a decrease in efficiency of the electric actuator 15a so that the electric actuator 15a is in an operating state outside a normal operating state. According to such a configuration, the primary monitoring controller 45 may diagnose an operating state of the electric actuator 15a. Consequently, the electric actuator 15a may be repaired or replaced before faults happening to the electric actuator 15a. In the present embodiment, since such a configuration for health monitoring is situated in the distal distributor 5, there is high-quality maintenance of the electric actuator 15a.

According to the power system 1, the relay device 43 in the second power source wire 6 is situated between the storage battery 27 and the electric actuator 15a (between the first and second portions 601, 602). According to the aforementioned configuration, for example, shorting in the electric actuator 15a or lightning strike is less likely to cause an abnormal current input from the electric actuator 15a to the storage battery 27 due to operation of the relay device 43. Consequently, the storage battery 27 is less likely to deteriorate. Therefore, there is an extended life of the storage battery 27.

According to the power system 1, the distal distributor 5 is separate from the central distributor 3. Power is supplied from the distal distributor 5 to the electric actuator 15 through the second power source wire 6. In this case, there is a shorter total wire length than a configuration in which individual wires extend from the central distributor 3 to each of the electric actuators 15a, 15b, 15c, 15d. Accordingly, there is a small wire weight per the weight of the aircraft 100. Therefore, there may be a narrow space for the wires in the aircraft 100. The relay device 43 in the distal distributor 5 may make an abnormal current less likely to be caused by device faults such as earthing and transmitted from the electric actuator 15a to the central distributor 3.

According to the power system 1, the storage battery 27 in the distal distributor 5 is connected to the second power source wire 6 which is connected to the central distributor 3. According to the aforementioned configuration, when there is an interruption of power supply from the central distributor 3 to the distal distributor 5, power is supplied from the storage battery 27 to the electric actuator 15a. In addition, since the storage battery 27 is situated in the distal distributor 5, the storage battery 27 is situated near the electric actuator 15a which consumes energy. Therefore, the power is supplied very efficiently to the electric actuator 15a.

Modification Examples

Various modifications may be applied to the aforementioned embodiment. Various modifications are described below.

(1) In the aforementioned embodiment, the lightning surge protectors 42a, 42b are situated in the channels 31, 32, 33, 34. Alternatively, the lightning surge protectors 42a, 42b may be omitted. There may be only one lightning surge protector situated in the distal distributor 5. In this case, the lightning surge protector in the first portion 601 of the second power source wire 6 is situated, for example, between the storage battery 27 and the bifurcation 6a.

(2) In the aforementioned embodiment, the electric actuators 15 are connected to the distal distributor 5. Alternatively, electrical devices other than the electric actuators 15 may be connected to the distal distributor 5.

(3) In the aforementioned embodiment, a channel is provided for each of the electric actuators 15. Alternatively, one channel 31 may simultaneously control the electric actuators 15.

(4) In the aforementioned embodiment, signals from the secondary monitoring controller 25 are output to the flight control computer 14 via the distal distributor 5. Alternatively, the signals from the secondary monitoring controller 25 may not be output to the flight control computer 14 via the distal distributor 5 but directly to the flight control computer 14.

(5) In the aforementioned embodiment, the primary monitoring controller 45 is situated in the distal distributor 5 whereas the secondary monitoring controller 25 is situated in the electric actuator 15a. Alternatively, the primary monitoring controller 45 may be situated in the electric actuator 15a whereas the secondary monitoring controller 25 may be situated in the distal distributor 5. If the secondary monitoring controller 25 is situated in the distal distributor 5, the secondary monitoring controller 25 forms "monitoring controller" together with the primary monitoring controller 45.

Figure 6:
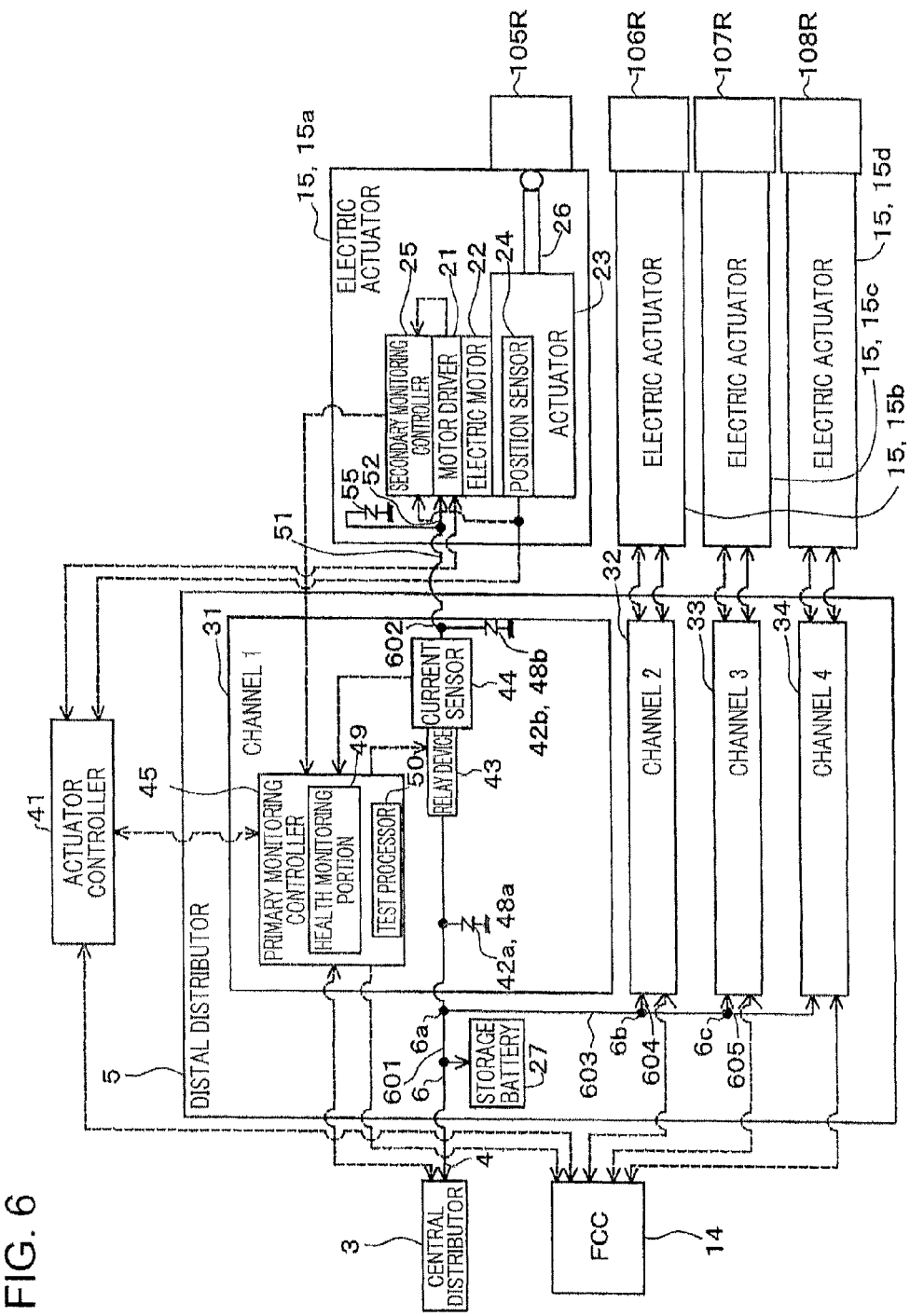
FIG. 6 is a diagram showing a modification of the first embodiment.

(6) In the aforementioned embodiment, the actuator controller 41 is situated in the distal distributor 5. Alternatively, the actuator controller 41 may be situated outside the distal distributor 5. For example, as shown in FIG. 6, the actuator controller 41 may be placed separately from the electric actuator 15a outside the distal distributor 5. The actuator controller 41 may be adjacent to the electric actuator 15a. In this case, the actuator controller 41 is connected to the flight control computer 14, the motor driver 21, the position sensor 24, the secondary monitoring controller 25 and the primary monitoring controller 45.

Figure 7:
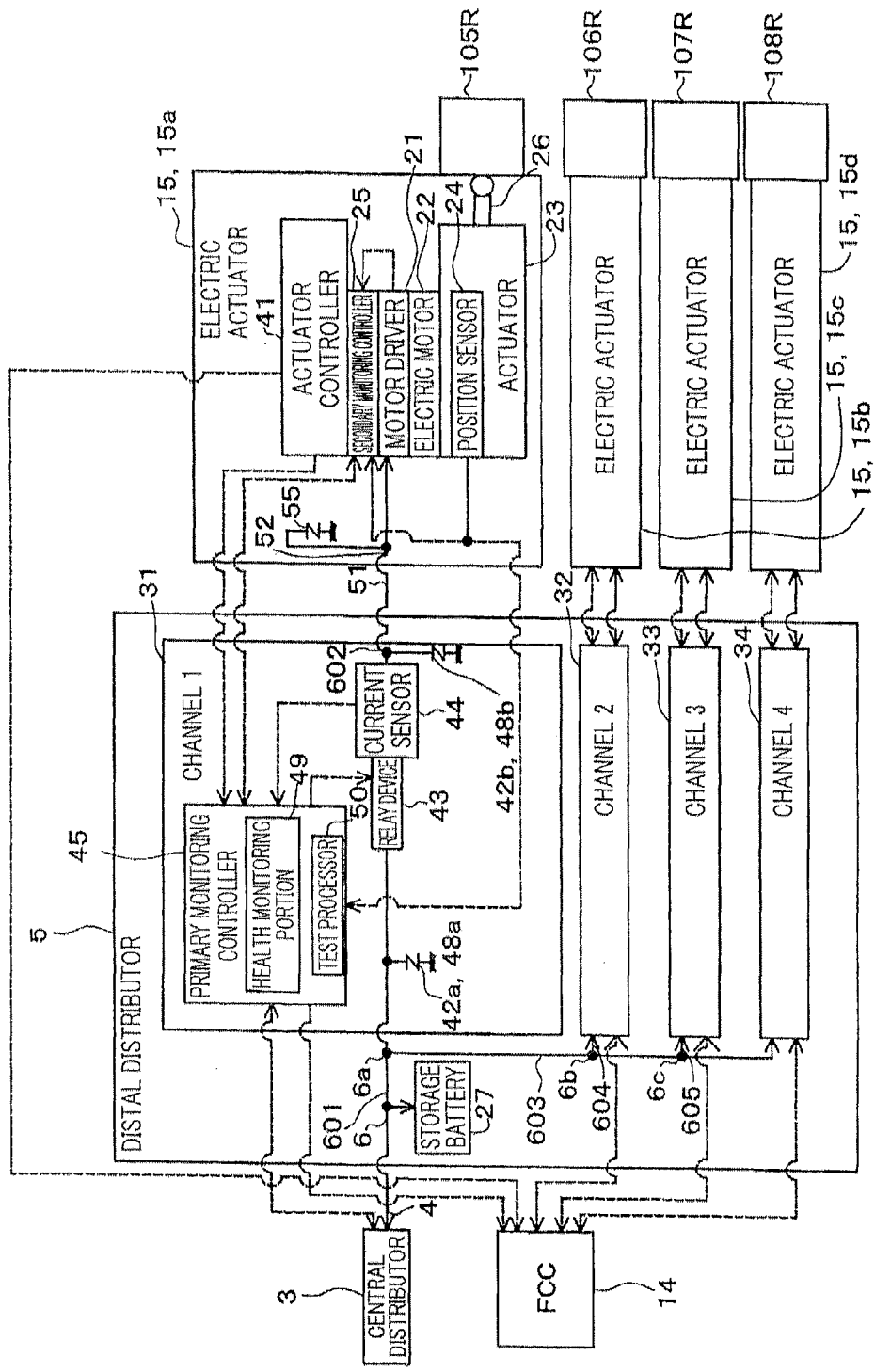
FIG. 7 is a diagram showing another modification of the first embodiment.

(7) With regard to a configuration in which the actuator controller 41 is situated outside the distal distributor 5, for instance, the actuator controller 41 may be integrated with the electric actuator 15a, as shown in FIG. 7. In this case, the actuator controller 41 is connected to the flight control computer 14, the motor driver 21, the position sensor 24, the secondary monitoring controller 25 and the primary monitoring controller 45. In this case, as shown in FIG. 7, control signals from the flight control computer 14 to the actuator controller 41 may be routed via the distal distributor 5 or may bypass the distal distributor 5. In the example shown in FIG. 7, the actuator controller 41 is connected directly to the flight control computer 14 and the primary monitoring controller 45. The position sensor 24 is connected directly to the secondary monitoring controller 25 and the primary monitoring controller 45.

(8) For example, if there is some abnormality happening to the power system 1, the actuator 23 of the electric actuator 15a may be controlled to be a free state (a state in which a rotary shaft of the electric motor 22 may rotate freely), a locked state or a damping state. In this case, for instance, a clutch mechanism and a brake mechanism are preferably situated between the rotary shaft of the electric motor 22 and the actuator 23. According to such a configuration, the movable portion 26 (movable wing) may be displaced freely by the clutch mechanism disengaging a coupling between the rotary shaft and the actuator 23. The displacement of the movable portion 26 (movable wing) is restricted by the brake mechanism.

(9) In the aforementioned embodiment, the electric actuator 15 includes a ball screw mechanism. Alternatively, the electric actuator 15 may include an electro hydrostatic actuator (EHA), instead of the ball screw mechanism.

Figure 8:
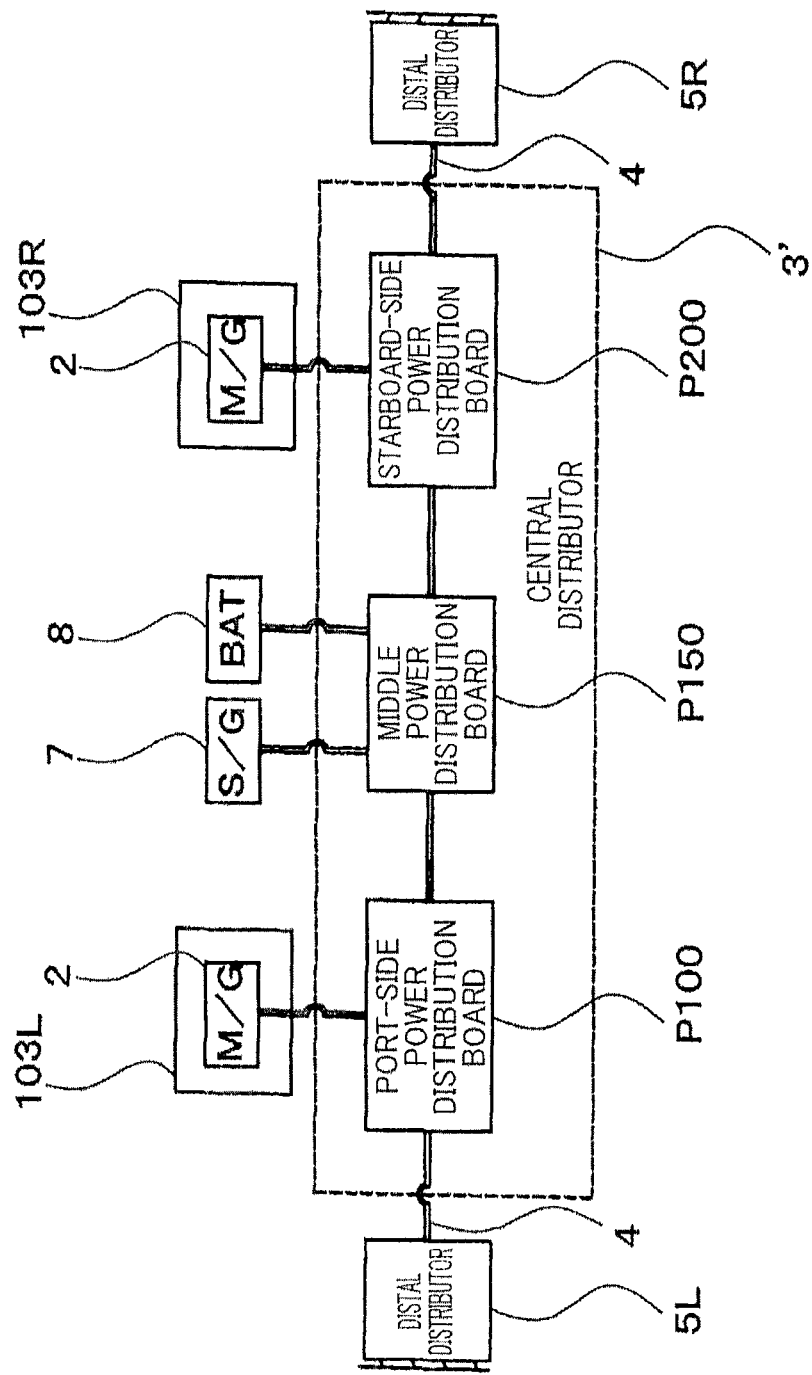
FIG. 8 is a diagram showing yet another modification of the first embodiment.

(10) In the aforementioned embodiment, the central distributor 3 is formed from one distributor. Alternatively, as shown in FIG. 8, a central distributor 3' having three distributors P100, P150, P200 may be used instead of the central distributor 3.

The central distributor 3' has a port-side distributor P100, a middle distributor P150 and a starboard-side distributor P200. The central distributor 3' may be regarded as a group of central distributors including these three distributors P100, P150, P200.

The port-side distributor P100 is connected to the port-side distal distributor 5L by one or more first power source wires 4 (in the present modification, two). The port-side distributor P100 receives power supply from the primary power generator 2 which is operated by the port engine 103L.

The middle distributor P150 is connected to the secondary power generator 7 and the main battery 8. The middle distributor P150 receives power supply from the secondary power generator 7 and the main battery 8. The middle distributor P150 is connected to the port-side distributor P100 and the starboard-side distributor P200 by the power source wires.

The starboard-side distributor P200 is connected to the starboard-side distal distributor 5R by one or more first power source wires 4 (in the present modification, two). The starboard-side distributor P200 receives power supply from the primary power generator 2 which is operated by the starboard engine 103R.

According to the aforementioned configuration, power is supplied from the port-side primary power generator 2 to the port-side distal distributor 5L via the port-side distributor P100. Power is supplied from the starboard-side primary power generator 2 to the starboard-side distal distributor 5R via the starboard-side distributor P200. Power is transmitted from the secondary power generator 7 and the main battery 8 to the middle distributor P150, and then supplied to the distal distributor 5L via the port-side distributor P100, and is also supplied to the distal distributor 5R via the starboard-side distributor P200.

For example, if the port-side primary power generator 2 fails to generate electricity because of faults in the port engine 103L, power is supplied from the starboard-side primary power generator 2 to the distal distributor 5L via the starboard-side distributor P200, the middle distributor P150 and the port-side distributor P100. Likewise, for example, if the starboard-side primary power generator 2 fails to generate electricity because of faults in the starboard engine 103R, power is supplied from the port-side primary power generator 2 to the distal distributor 5R via the port-side distributor P100, the middle distributor P150 and the starboard-side distributor P200.

The central distributor is not limited to the aforementioned configuration of the central distributors 3, 3' described above. The central distributor may be formed from two or four or more distributors.

Figure 9:
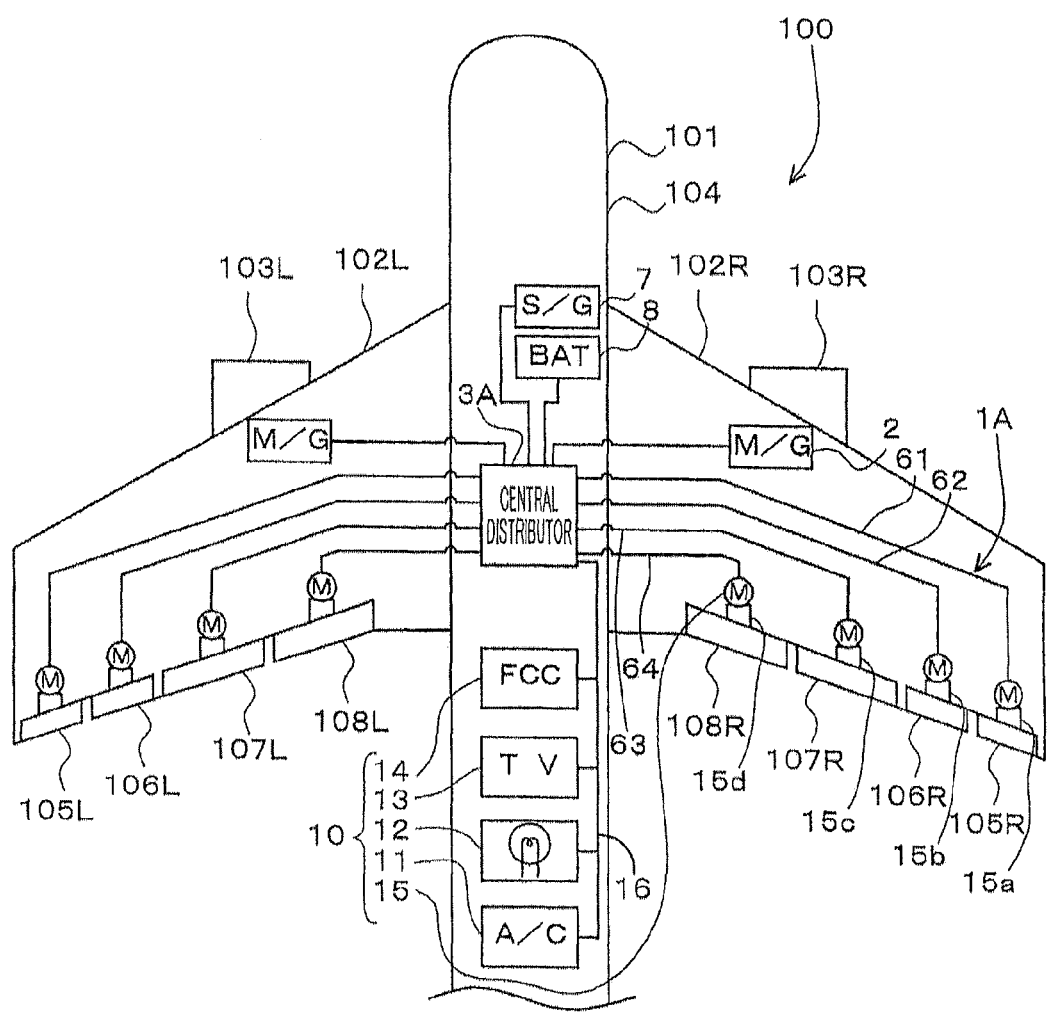
FIG. 9 is a diagram showing yet another modification of the first embodiment.

(11) In the aforementioned configuration, the central distributor 3 and the distal distributor 5 are situated in the aircraft 100. Alternatively, as shown in FIG. 9, a central distributor 3A may be situated instead of the central distributor 3 and the distal distributor 5.

In this case, the central distributor 3A is exemplified as "distributor". The central distributor 3A is situated in the fuselage 104. For example, the central distributor 3A has a structure with a housing in which the central distributor 3, the first power source wire 4 and the distal distributor 5 are stored. The central distributor 3A and the electric actuators 15a, 15b, 15c, 15d are connected via power source wires 61, 62, 63, 64.

More specifically, each of the channels 31 to 34 of the central distributor 3A is connected electrically to the corresponding one of the electric actuators 15a, 15b, 15c, 15d via the corresponding one of the power source wires 61, 62, 63, 64. In this way, each of the power source wires 61, 62, 63, 64 connects the central distributor 3 with the corresponding one of the electric actuator 15a, 15b, 15c, 15d.

According to the aforementioned configuration, one central distributor 3A functions as a hub. Power is supplied from the central distributor 3A to the electric actuators 15a, 15b, 15c, 15d. Therefore, there is a decrease in the number of distributors for supplying power to the electric actuators 15a, 15b, 15c, 15d. Consequently, there is a decrease in the number of components and a weight of the power system 1A.

(12) In the aforementioned modification example, the central distributor 3A and the electric actuators 15 (15a, 15b, 15c, 15d) are connected by the power source wires 61 to 64.

Figure 10:
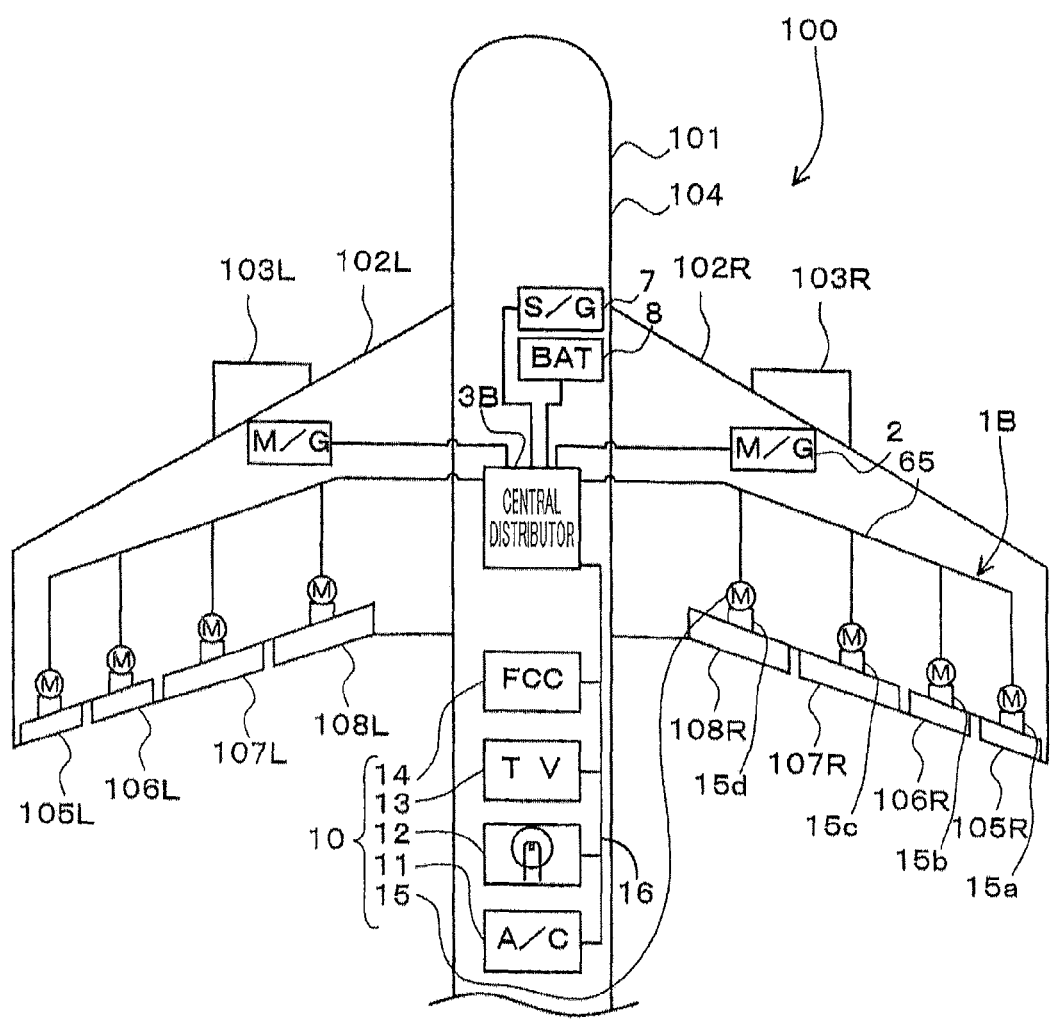
FIG. 10 is a diagram showing yet another modification of the first embodiment.

Alternatively, as shown in FIG. 10, the electric actuators 15 (15a, 15b, 15c, 15d) may be connected to the central distributor 3B by one power source wire 65. In this case, the central distributor 3B is exemplified as "distributor". In this case, one channel 31 operates each of the electric actuators 15a, 15b, 15c, 15d simultaneously.

According to the aforementioned configuration, since one power source wire 65 is used as a mother wire, the power is supplied from the central distributor 3B to the electric actuators 15 (15a, 15b, 15c, 15d). Therefore, there is a decrease in a total wire length for supplying power to the electric actuators 15a, 15b, 15c, 15d. Consequently, there is a decrease in a weight of the power system 1B.

As described above, the distributors 3A, 3B may be formed from two or more groups of distributors.

(13) In the aforementioned embodiments, ailerons and spoilers are used as steering surfaces which are operated by the electric actuators. Alternatively, the principles of the aforementioned embodiments may be applied to other steering surfaces such as the elevators, rudder, flaps and alike. The principles of the aforementioned embodiments may be applied to an electric actuator which drives the legs of the landing gear or alike as devices situated in the aircraft.

The various technologies described in the context of the aforementioned various embodiments mainly include the following features.

(1) The distribution apparatus described in the context of the aforementioned embodiments is used in order to distribute power. The distribution apparatus includes: a distributor which uses regenerative power to charge a storage battery connected to the distribution apparatus, the regenerative power being generated by at least one electric actuator electrically connected to the distribution apparatus; and a switch situated between the distributor and the at least one electric actuator to interrupt a current when the current exceeds a prescribed level.

According to the aforementioned configuration, when regenerative power is generated by the electric actuator, the regenerative power is output to the storage battery. Therefore, the regenerative power generated by the electric actuator is used for the electric actuator or other electrical devices. Consequently, the aircraft may use power efficiently. In the event of abnormality such as shorting in the electric actuator, an operation of the switch may prevent an abnormal current from flowing from the electric actuator to the distributor. Therefore, little abnormality happens to the distributor. Consequently, the distribution apparatus may achieve efficient power usage in an aircraft and cause little abnormality in the distributor.

(2) The distribution apparatus may include a gating controller for controlling a gating operation of the switch in order to interrupt the current. The gating controller may perform the gating operation in response to a detection value of a current sensor which detects the current.

According to the aforementioned configuration, the gating controller may switch off (performing an opening operation) of the switch in response to a detection value of the current sensor to prevent an abnormal current from flowing to the distributor and the electric actuator. With regard to the method on the basis of the detection of the current sensor, it may be determined whether or not a magnitude of the detected value is sufficiently large to cause abnormality in the distributor, or whether or not a change rate is greater than a prescribed level so that it is predicted the current becomes sufficiently large to cause abnormality in the distributor after a prescribed time.

(3) The distributor may have a lightning surge protector electrically connected to the at least one electric actuator, the lightning surge protector including a variable resistance.

According to the aforementioned configuration, the variable resistance rapidly rises a resistance value, instead of controlling a switch to an open condition or a close condition, once an excessive current flows, in order to prevent a surge current from flowing to the distributor or the electric actuator, the surge current being resultant from a lightning strike or alike.

(4) The distribution apparatus may include a monitoring controller which monitors the at least one electric actuator. The monitoring controller may control the gating operation of the switch.

According to the aforementioned configuration, the monitoring controller may monitor whether or not there is abnormality, for instance, in the electric actuator. Therefore, abnormality happening to the distributor may be prevented in advance by opening the switch before an excessively large current resultant from the abnormality.

(5) The switch may be situated in a wire between the storage battery and the at least one electric actuator.

According to the aforementioned configuration, for example, the operation of the switch prevents an abnormal current from being input to the storage battery if the abnormal current from the electric actuator happens under shorting in the electric actuator or lightning strike. Consequently, the storage battery is less likely to deteriorate. Therefore, there is an extended life of the storage battery.

(6) The distributor may be provided as a distal distributor which receives power supply from a central distributor situated in an aircraft.

According to the aforementioned configuration, the distal distributor is separate from the central distributor. For example, power is supplied from the distal distributor to the electric actuator by a wire. In this case, there is a shorter total wire length than a configuration in which individual wires extend from the central distributor to the electrical devices including the electric actuators, respectively. Accordingly, there is a decreased wire weight per a weight of the aircraft. There may be a narrow space for the wire in the aircraft. The switch in the distal distributor makes device faults such as earthing less likely to cause abnormal current transmission from the electric actuator to the central distributor.

(7) The storage battery may be connected to a wire which connects the distal distributor to the central distributor.

According to the aforementioned configuration, when there is an interruption of power supply from the central distributor to the distal distributor, power is supplied from the storage battery to the electric actuator. For example, if the storage battery is situated in the distal distributor, the storage battery may be placed near an electric actuator which consumes energy. Therefore, there may be more efficient power supply to the electric actuator.

(8) The distribution apparatus may include several electric wires. The at least one electric actuator may include several actuators, each of which corresponds to each of the electric wires. Each of the electric wires may connect the distributor to the actuators.

According to the aforementioned configuration, power is supplied to each of the electric actuators by using one distributor as a hub. Consequently, there are a reduced number of distributors for supplying power to the electric actuators. Therefore, there are fewer components and a decreased weight of the distribution apparatus.

(9) The at least one electric actuator may include several actuators. The actuators may be connected to the distributor by one wire.

According to the aforementioned configuration, since one wire is used as a mother wire, power is supplied from the distributor to the electric actuators. Consequently, there is a short total length of the wire for power supply to the electric actuators. Therefore, there is a reduced weight of the distribution apparatus.

(10) The monitoring controller may diagnose an operating state of the at least one electric actuator on the basis of a relationship between a power supply amount from the distributor to the at least one electric actuator and a mechanical operation amount of the at least one electric actuator.

According to the aforementioned configuration, for example, if a mechanical operation amount of the electric actuator is excessively smaller than a power supply amount from the distal distributor to the electric actuator, the monitoring controller may determine that there is a decrease in efficiency of the electric actuator so that the electric actuator is in an operating state outside a normal operating state. According to such a configuration, the monitoring controller may diagnose an operating state of the electric actuator.

(11) The at least one electric actuator may include an electric actuator for a flight control system to operate a movable wing of the aircraft.

According to the aforementioned configuration, the electric actuator for the flight control system generates regenerative power, for example, when the movable wing receives air resistance and moves. The regenerative power is output to the storage battery. Consequently, the aircraft may use power efficiently.

(12) The distributor may output power to the at least one electric actuator, the power being generated by a power generator of the aircraft. The distributor may output the power from the storage battery to the at least one electric actuator.

According to the aforementioned configuration, the distributor may output power from at least one of the power generator and the storage battery to the electric actuator. When the power stored in the storage battery is supplied to the electric actuator, there is a reduction in power generation load of the power generator. Consequently, since the power generator requires a small amount of energy for the power generation operation, the aircraft may use power efficiently. For example, in the event of abnormality in the power generator, the electric actuator may use power from the storage battery and operate. Consequently, the electric actuator may operate very reliably.

(13) The actuator controller and the monitoring controller are situated in the distributor. The actuator controller and the monitoring controller are formed from different calculation processing units.

According to the aforementioned configuration, since both of the actuator controller and the monitoring controller are situated in the distributor, the actuator controller and the monitoring controller are close to each other. Therefore, there is a compact design of the distribution apparatus. The actuator controller and the monitoring controller are formed from different calculation processing units. Therefore, there is a reduced calculation load in the actuator controller. Consequently, the actuator controller may carry out calculation processes required to control the electric actuator rapidly under a condition with few errors. Therefore, the actuator controller controls the electric actuator very quickly.

(14) The monitoring controller may be configured to control a gating operation of the switch.

According to the aforementioned configuration, the monitoring controller may operate as a gating controller which controls the gating operation of the switch.

(15) The monitoring controller may diagnose an operating state of the at least one electric actuator.

According to the aforementioned configuration, the monitoring controller may have a function for diagnosing an operating state of the electric actuator (i.e. a health monitoring function for the electric actuator). Consequently, there is simplified maintenance of the electric actuator.

The principles of the aforementioned embodiments may be applied broadly to distribution apparatuses.

This application is based on Japanese Patent application No. 2013-229625 filed in Japan Patent Office on Nov. 5, 2013, the contents of which are hereby incorporated by reference.

Although the present invention has been fully described by way of example with reference to the accompanying drawings, it is to be understood, that various changes and modifications will be apparent to those skilled in the art. Therefore, unless otherwise such changes and modifications depart from the scope of the present invention hereinafter defined, they should be construed as being included therein.

The invention claimed is:

1. A distribution apparatus for distributing power which is supplied from an electric power supply, comprising:
  a distributor which uses a regenerative current to charge a storage battery connected to the distribution apparatus, the regenerative current being generated by at least one electric actuator electrically connected to the distribution apparatus,
  wherein the distributor is configured to output a supply current from at least one of the electric power supply and the storage battery to the at least one electric actuator; and
  a switch situated within the distributor and electrically connected with said at least one electric actuator to interrupt the supply current flowing from the at least one of the electric power supply and the storage battery to the at least one electric actuator when the supply current exceeds a predetermined level, so that the switch prevents a malfunction of at least one of the distributor and the at least one electric actuator.

2. The distribution apparatus according to claim 1, further comprising a gating controller which performs a gating operation of the switch in order to interrupt the supply current, wherein the gating controller performs the gating operation in response to a detection value of a current sensor which detects the supply current.

3. The distribution apparatus according to claim 2, further comprising a monitoring controller configured to monitor the at least one electric actuator, wherein the monitoring controller controls the gating operation of the switch.

4. The distribution apparatus according to claim 3, wherein the monitoring controller diagnoses operating state of the at least one electric actuator on the basis of a relationship between a power supply amount from the distributor to the at least one electric actuator and a mechanical operation amount of the at least one electric actuator.

5. The distribution apparatus according to claim 1, wherein the distributor has a lightning surge protector electrically connected to the at least one electric actuator, the lightning surge protector including a variable resistance.

6. The distribution apparatus according to claim 1, wherein the switch is situated in a wire between the storage battery and the at least one electric actuator.

7. The distribution apparatus according to claim 1, wherein the distributor is provided as a distal distributor, which is configured to receive power supply from a central distributor situated in an aircraft.

8. The distribution apparatus according to claim 7, wherein the storage battery is connected to a wire which connects the distal distributor to the central distributor.

9. The distribution apparatus according to claim 1, further comprising electric wires, wherein the at least one electric actuator includes actuators, each of which corresponds to each of the electric wires, and wherein each of the electric wires connects the distributor to each of the actuators.

10. The distribution apparatus according to claim 1, wherein the at least one electric actuator includes actuators, and wherein the actuators are connected to the distributor by one wire.

* * * * *